United States Patent
Green et al.

(10) Patent No.: US 9,542,104 B2
(45) Date of Patent: Jan. 10, 2017

(54) SYSTEM AND METHOD FOR CONTROLLING A STORAGE DEVICE

(71) Applicant: HGST Netherlands B.V., Amsterdam (NL)

(72) Inventors: Paul M. Green, Hollister, CA (US); David H. Jen, San Jose, CA (US); Remmelt Pit, Palo Alto, CA (US)

(73) Assignee: Western Digital Technologies, Inc., Irvine, CA (US)

(*) Notice: Subject to any disclaimer, the term of this patent is extended or adjusted under 35 U.S.C. 154(b) by 174 days.

(21) Appl. No.: 13/958,949

(22) Filed: Aug. 5, 2013

(65) Prior Publication Data

US 2015/0039806 A1 Feb. 5, 2015

(51) Int. Cl.
G06F 12/00 (2006.01)
G06F 3/06 (2006.01)
G06F 13/00 (2006.01)
G06F 13/28 (2006.01)

(52) U.S. Cl.
CPC ........... *G06F 3/0614* (2013.01); *G06F 3/0634* (2013.01); *G06F 3/0653* (2013.01); *G06F 3/0676* (2013.01); *G06F 3/0679* (2013.01)

(58) Field of Classification Search
CPC .... G06F 3/0653; G06F 3/0676; G06F 3/0679; G06F 3/0614
USPC .......................................................... 711/103
See application file for complete search history.

(56) References Cited

U.S. PATENT DOCUMENTS

| | | | |
|---|---|---|---|
| 6,892,249 B1* | 5/2005 | Codilian et al. | 710/5 |
| 7,599,139 B1* | 10/2009 | Bombet et al. | 360/31 |
| 7,761,244 B2 | 7/2010 | Gross et al. | |
| 7,991,923 B2* | 8/2011 | Shu et al. | 710/8 |
| 8,032,698 B2 | 10/2011 | Nam | |
| 8,452,566 B2* | 5/2013 | Goodnow et al. | 702/117 |
| 8,548,639 B2* | 10/2013 | Lim | G06F 1/206 360/75 |
| 8,825,977 B1* | 9/2014 | Syu et al. | 711/165 |
| 2006/0171057 A1 | 8/2006 | Lee | |
| 2007/0219747 A1 | 9/2007 | Hughes et al. | |
| 2008/0141235 A1* | 6/2008 | Woodbury et al. | 717/168 |

(Continued)

FOREIGN PATENT DOCUMENTS

EP 2602707 A2 * 6/2013 ............... G06F 3/06
JP H09251334 A 9/1997

OTHER PUBLICATIONS

Citea, Mihaela, "A benchmark utility for Solid State Drives", http://www.softpedia.com/get/System/Benchmarks/AS-SSD-Benchmark.shtml, Dec. 22, 2012.

(Continued)

*Primary Examiner* — Mark Giardino, Jr.

(74) *Attorney, Agent, or Firm* — Alleman Hall McCoy Russell & Tuttle LLP

(57) ABSTRACT

A method of controlling a storage device includes detecting a cumulative usage condition associated with the storage device, comparing the cumulative usage condition to a usage value, and adjusting the operation of the storage device based on the comparison. Another method of controlling a storage device includes detecting an operating condition associated with the storage device, comparing the operating condition to a warranty condition, and limiting the operation of the storage device to read-only operation based on the comparison.

25 Claims, 3 Drawing Sheets

(56) References Cited

U.S. PATENT DOCUMENTS

2012/0023287 A1  1/2012  Fukuda
2012/0239976 A1  9/2012  Cometti et al.

OTHER PUBLICATIONS

"Samsung Solid-State Drives for PCs and Mobile Devices", http://www.samsung.com/global/business/semiconductor/product/flash-ssd/overview, 2013.
Jiang, et al, "HDD Micro-actuator Reliability Study", 2007.
"Best Practices for SSD Performance Testing", Seagate Technology Paper, 2012.

\* cited by examiner

SYSTEM AND METHOD FOR CONTROLLING A STORAGE DEVICE

FIELD OF THE DISCLOSURE

This disclosure, in general, relates to systems and methods for controlling storage devices and in particular, to systems and methods for controlling storage devices based on usage or usage conditions.

BACKGROUND

With the continued expansion of the Internet and the advent of cloud computing, there is an increased demand for storage devices. Large data centers are storing ever-increasing volumes of data. As such, demand for storage devices, such as hard drives or solid-state storage is increasing. However, for manufacturers of such storage devices, large volume users can represent increased risk and liability associated with warranty issues.

Operating a large data center is costly. Temperature control utilizes air cooling fans that consume power, generate noise, and require long term reliability. Vibration control utilizes rigid structural supports to prevent crosstalk between drives, as well as interaction with moving parts such as cooling fans. Shock control utilizes special mounting configurations and rack installation procedures, plus hardware such as rubber bumpers. Power supplies should to be clean and well centered at the target (5V/12V) with low ripple and no large transient spikes. When data centers encounter cost pressures, the temptation arises to limit cost, particularly, by reducing the use of the costly supporting gear described above. A storage device manufacturer, whose reputation depends on the reliability of a product running in an environment that is controlled by customers, interests collide when these cost issues lead to cost cutting by customers. In addition, the usage of a storage device in a large data center can be more demanding than usage of a storage device by a conventional residential or office user. The extensive use of a storage device by the data center can lead to early failure of the storage device.

On the other hand, portable mobile devices may provide worse environmental conditions than large data centers. Specific issues include overheating from inadequate airflow cooling caused by overcrowding in limited available space and shock exposures due to extensive handling that is expected in portable mobile devices. Elevated exposure to power-save features in drives may also have reliability consequences. As such, a poor design or use of cheap parts by laptop manufacturers, for example, can cause problems for the storage device. Each of these customer controlled issues can raise warranty issues and liabilities to be addressed by the manufacturer.

As such, manufacturers are seeking more flexibility in addressing warranty issues and storage device performance, particularly in demanding environments, such as large data centers.

SUMMARY

In a first aspect, a method of controlling a storage device includes detecting a cumulative usage condition associated with the storage device, comparing the cumulative usage condition to a usage value, and adjusting the operation of the storage device based on the comparison.

In a second aspect, a method of controlling a storage device includes detecting an operating condition associated with the storage device, comparing the operating condition to a warranty condition, and limiting the operation of the storage device to read-only operation based on the comparison.

In a third aspect, a storage device includes a storage medium, a data interface in communication with the storage medium, a controller in communication with the storage medium and the data interface, and non-volatile storage including instructions operable by the controller to detect a cumulative usage condition associated with the storage device, compare the cumulative usage condition to a usage value, and adjust the operation of the storage device based on the comparison.

In a fourth aspect, a storage device includes a storage medium, a data interface in communication with the storage medium, a controller in communication with the storage medium and the data interface, and non-volatile storage including instructions operable by the controller to detect an operating condition associated with the storage device, compare the operating condition to a warranty condition, and limit the operation of the storage device to read-only operation based on the comparison.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an exemplary embodiment, the operation of a storage device, such as a hard disk drive or a solid state drive, can be adjusted based on detected operating conditions, such as cumulative usage conditions or environmental history conditions. Such operating conditions are to be contrasted with data error conditions relating to input/output errors or storage media degradation. For example, when a cumulative usage condition exceeds an operational value or threshold or when an environmental history condition violates an environmental parameter, the performance of the storage device can be adjusted. For example, read or write operations can be slowed, e.g., by adding a delay to a read or write operation, or the storage device can be limited in its operability to read-only operation. In a particular example, following adjustment of the operation of the storage device, firmware can be updated, for example, by changing parameters to be compared to operating conditions. Once the firmware is updated, the operation of the storage device can be readjusted, in an example, providing the previous level of performance.

In another example, a manufacturer can analyze one or more storage devices from a set of manufactured storage devices. Analysis of the storage devices can lead to a set of cumulative usage or environmental history parameters that can be set in the firmware of the storage device. Such cumulative usage or environmental history parameters can be compared with detected operating conditions, and the performance of a storage device can be adjusted based on the comparison. In such a manner, a manufacturer can establish technical parameters and associate those technical parameters with warranty conditions implemented within the storage device. If a set of storage devices is shown through ongoing usage to perform better than the warranty conditions and the storage devices are being used in accordance with environmental history parameters, a firmware of the storage devices can be updated to provide extended life or usage of the storage devices.

Figure 1:
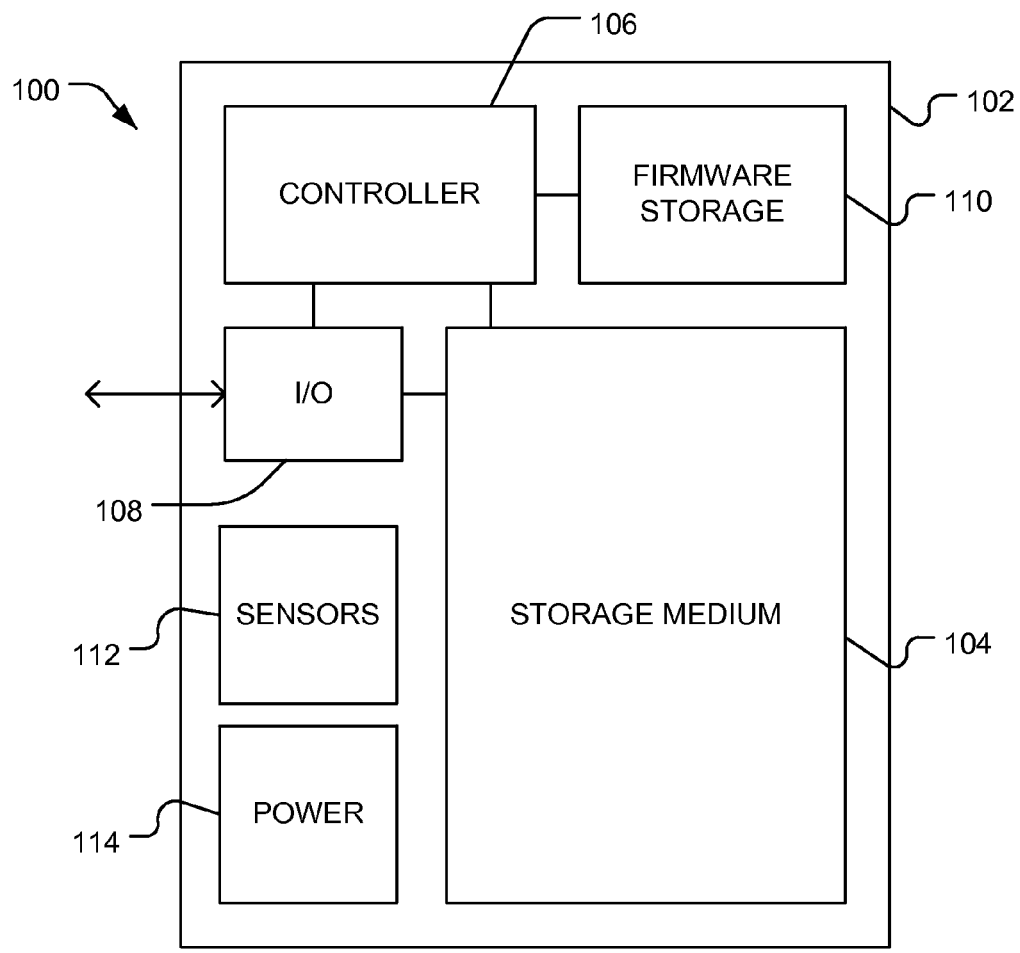
FIG. 1 includes an illustration of an exemplary storage device.

As illustrated in FIG. 1, the storage device 100 includes storage media 104 in communication with an input/output interface 108. A controller 106 can control the performance of the input/output interface 108 and storage media 104. In an example, the controller 106 operates based on firmware instructions stored in firmware storage 110. In addition, the storage device 100 can include sensors 112 and a power interface 114. Each of the storage medium 104, the controller 106, the input/output interface 108, the firmware storage 110, the sensors 112, and the power interface 114 can be disposed within a housing 102.

The storage medium 104 is a nonvolatile storage medium. The storage medium 104 can be a solid-state storage medium, a magnetic disk medium, or a read/write functional optical medium. In a particular example, the storage medium is a solid-state storage medium. In another example, the storage medium has a magnetic base storage medium, such as a hard disk drive.

The firmware storage 110 can be a separate flash memory storing the firmware instructions operable by the controller 106. In another example, the firmware storage 110 can be incorporated on the same substrate as the controller 106. In an alternative example, the firmware storage 110 can utilize a portion of storage medium 104.

The input/output interface 108 can provide data to and receive data from external devices using proprietary or standard interfaces. Exemplary standard interfaces include serial attached SCSI, serial ATA, PCI, fiber channel, USB, IDE, SCSI, derivatives thereof, combinations thereof, or the like. While not illustrated, additional cache or buffer storage can be incorporated into the interface or form part of the storage medium 104 for storing data to be moved to or from the storage medium 104. In an example, the controller 106 can monitor and track data supplied through the input output interface 108 and determine a cumulative amount of data transferred through the interface 108 or cumulative amounts of data written or read from the storage media 104. In another example, the controller 106 can monitor the cumulative time the storage device 100 remains powered on. In a further example, the controller 106 can monitor the cumulative number of times the storage device 100 is powered on.

The storage device 100 can also include sensors 112. The sensors 112 can measure data indicative of environmental conditions to which the storage media 104 are exposed. Those conditions can be monitored over time to formulate an environmental history experienced by the storage device 100. Such an environmental history can be utilized by the controller 106 as part of a determination as to whether to adjust or modify the performance of the storage device 100. Exemplary sensors include temperature sensors, vibration sensors, or power quality sensors. For example, one of the sensors 112 can measure characteristics of the power provided to the power interface 114 of the storage device 100. In another example, the sensor 112 can measure a temperature of the storage device 100. Such temperature measurements can be stored or utilized to formulate a temperature history. In another example, a vibration sensor can detect various frequency vibrations that can lead to damage or reduce performance of the storage device 100. In a further example, a shock sensor can detect various shock events that can damage the storage device 100.

Figure 2:
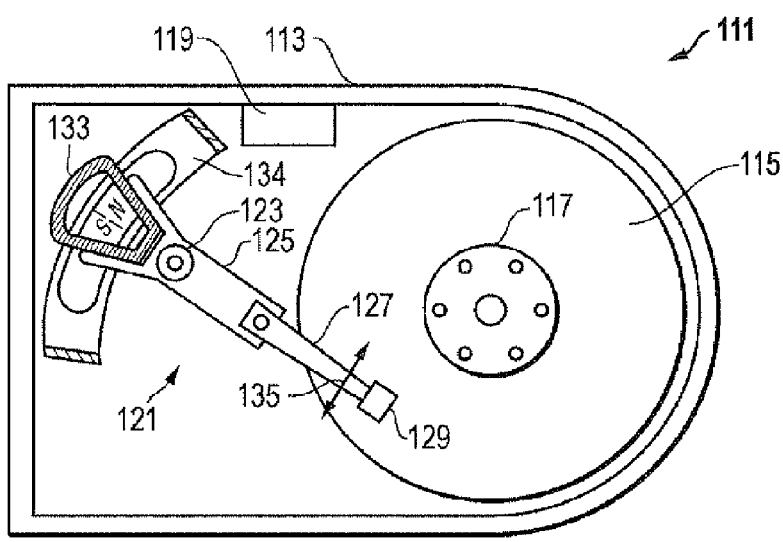
FIG. 2 includes an illustration of exemplary magnetic hard disk drive.

In a particular example, the storage medium 104 is a hard drive including a disk magnetic media. Referring now to FIG. 2, storage device includes a magnetic hard disk drive 111. The drive 111 has an outer housing or base 113 containing at least one magnetic disk 115. The disk 115 is rotated by a spindle motor assembly having a central drive hub 117. An actuator 121 includes one or more parallel actuator arms 125 in the form of a comb that is pivotally mounted to base 113 about a pivot assembly 123. A controller 119 is also mounted to base 113 for selectively moving the comb of arms 125 relative to disk 115.

In the embodiment illustrated, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from or magnetically write data to the disk 115. The head gimbal assembly is the head and the slider 129, which are mounted on suspension 127. The slider 129 is usually bonded to the end of suspension 127. The head can be formed from ceramic or intermetallic materials and pre-loaded against the surface of disk 115 by suspension 127.

Suspensions 127 have a spring-like quality which biases or urges the air bearing surface of the slider 129 against the disk 115 to enable the creation of the air bearing film between the slider 129 and disk surface. A voice coil 133 housed within a voice coil motor magnet assembly 134 is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks.

Figure 3:
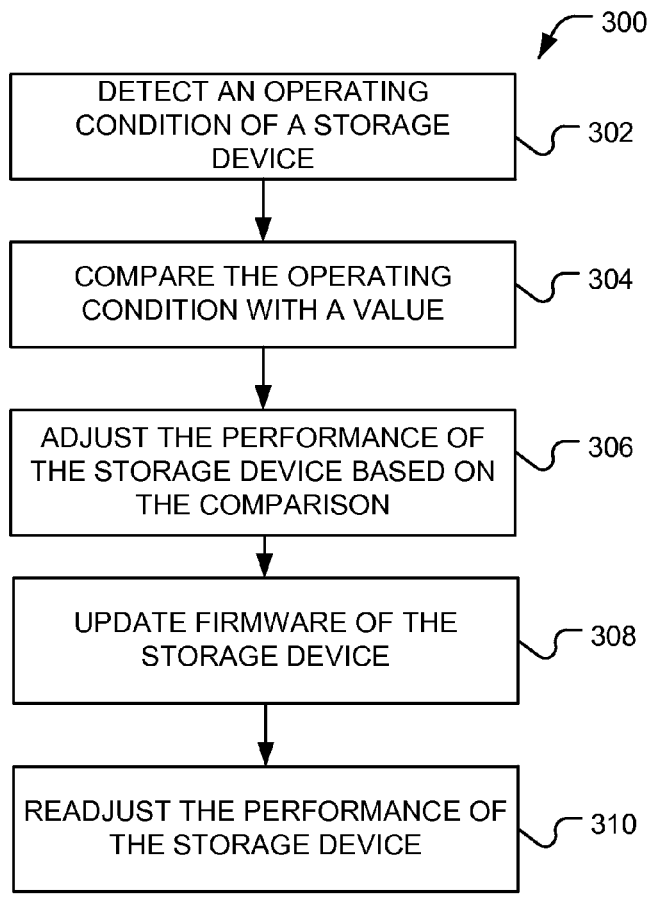
FIG. 3, FIG. 4, FIG. 5 and FIG. 6 include block flow diagrams of exemplary methods for controlling, using, or setting performance of a storage device.

Returning to FIG. 1, the controller 106 of the storage device 100 can detect an operating condition of the storage device, such as a condition indicative of cumulative usage or environmental history, and can adjust the operation of the storage device based on the detected operating condition. For example, FIG. 3 includes an illustration of an exemplary method 300. A controller can monitor or periodically detect an operating condition of the storage device, as illustrated at 302. The operating condition can include a cumulative usage condition or an environmental history condition. In an example, a cumulative usage condition can be a cumulative number of power-on hours, cumulative operating time, cumulative data transfer, cumulative power-on events, or a combination thereof. For example, the operating condition can be the cumulative amount of read or written data. In another example, the operating condition can be a cumulative power-on time. In a further example, the operating condition can be a number of power-on events. Exemplary environmental history conditions include temperature history, shock/vibration characteristics, or power supply quality. Environmental history is different than immediate conditions and is instead a cumulative measure of the history experienced by the device. For example, the temperature history conditions can include average temperature, a number of times temperature is outside a specified zone, a maximum or minimum temperature, or a combination thereof. In another example, power quality can include a measure of power spikes within the supplied power, underlying frequencies of deviations, or statistical measures of power fluctuation. Vibration characteristics can include detection of excessive steady-state vibration amplitudes at specific vulnerable frequencies, particularly those that can damage components of the storage device or cause reliability failures. Shock characteristics can include detection of excessive shock impulse magnitudes that can damage fragile components. Shock events and steady-state vibration may be considered to be distinct parameters. Shock events are large magnitude short duration events, whereas steady-state vibration events provide on-going vibrations at particular frequencies. In a further example, the sensors can include a witness plate device that can record the maximum or minimum exposure to shock or temperature/humidity while the drive is unpowered, for example, during shipping/storage and handling.

The operating conditions are different than error conditions. Generally, error conditions are indicative of errors within input/output data or read/write data indicative of storage medium degradation. Instead, the operating conditions are conditions indicative of cumulative usage or environmental history of the storage device.

The detected operating condition can be compared with an operating value or parameter, as illustrated at 304. For example, a cumulative usage condition can be compared with a threshold value. In another example, an environmental condition can be measured and compared to a range of conditions, such as those specified within technical specifications associated with the storage medium and optionally the warranty. In particular, the operating values or parameters to which the operating conditions are compared can be warranty conditions set for the warranty associated with the storage device. In addition, the system can include more than one operating value or parameter associated with an operating condition. For example, a first lower threshold and a second higher threshold can be associated with cumulative usage.

As illustrated at 306, the performance of the storage device can be adjusted based on the comparison. For example, read/write operations can be adjusted based on a comparison of cumulative usage data with a usage threshold value. In another example, the performance of a storage device can be adjusted when the temperature history violates an established range or pattern. For example, the performance of the storage device can be adjusted by adding a delay to read operations or write operations. In another example, the performance of the storage device can be changed to a read-only operation.

Detecting, comparing, and adjusting can be performed for a single operating condition and a single operating parameter associated with the single operating condition. Alternatively, the method can be performed using more than one operating condition and associated operating parameters, or a combination thereof. In another example, each operating condition can be associated with more than one operating parameter and the performance of the storage device can be adjusted based on which operating parameter is exceeded.

Optionally, a manufacturer can provide an update to firmware for the storage device, as illustrated 308. Such an update can change the operating values or parameters associated with operating conditions. As a result, the performance of the storage device can be readjusted, as illustrated at 310. For example, the previous performance can be restored or a new performance can be established based on the reliability of similar storage devices.

In a particular example, the performance adjustments can ramp rates of read or write operations. In particular, more than one operating value or parameter can be associated with an operating condition. For example, a first read or write rate limit or delay can be applied when the operating condition exceeds a threshold operating value. A second rate or delay can be applied when the operating condition exceeds a second threshold value. Optionally, the operation of the storage device can be adjusted to a read-only operation when an additional operating threshold value is exceeded.

Figure 4:
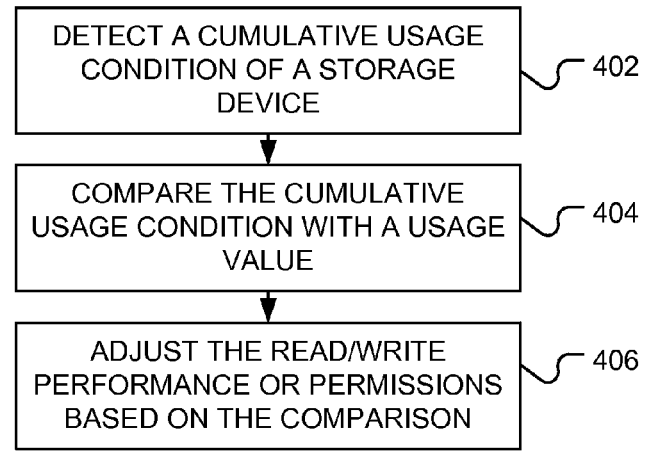

In a particular example illustrated in FIG. 4, a method 400 includes detecting a cumulative usage condition of the storage device, as illustrated at 402. For example, the cumulative usage condition can include cumulative power-on time or a number of power-on events, or can include a cumulative data transfer or cumulative read/write operations. A controller can compare the cumulative usage condition with a usage value, such as a usage threshold value, as illustrated at 404. For example, the cumulative data transfer can exceed a usage threshold. In another example, the cumulative power-on time can exceed a threshold. In a further example, the number of power-on events can exceed a threshold.

The controller can adjust the read/write performance or access permissions based on the comparison, as illustrated at 406. For example, when cumulative usage exceeds a usage threshold, a rate of read/write operations can be adjusted. For example, a delay can be implemented prior to read/write operations. In another example, the data access permissions associated with storage device can be limited to read-only operations.

Figure 5:
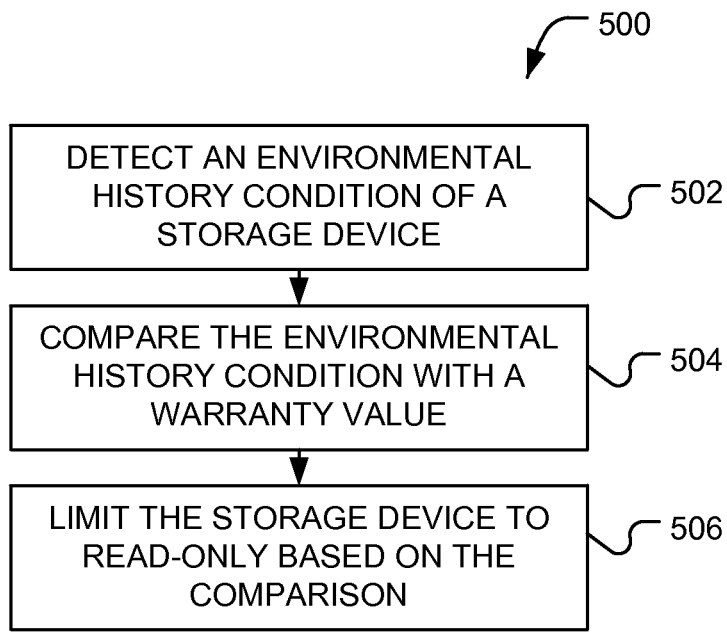

In another example illustrated in FIG. 5, a method 500 includes detecting an environmental history of the storage device, as illustrated 502. The environmental history of the storage device can be compared with a warranty value by the controller, as illustrated 504. The warranty value can be a parameter or range set by the manufacturer based on design specifications or limitations of the storage medium. For example, the power quality can be poor and not match technical specifications. In another example, the temperature history can indicate repeated violations of a temperature range provided in the technical specifications. In a further example, the environmental history can indicate vibrations at a frequency that can cause damage to the storage device.

The controller can limit the storage device to read-only operation based on the comparison, as illustrated at 506. For example, when the power quality is indicated as being poor, the temperature history violates a range, or damaging vibrations are detected, a storage device can limit the data access operations to read-only operations.

Figure 6:
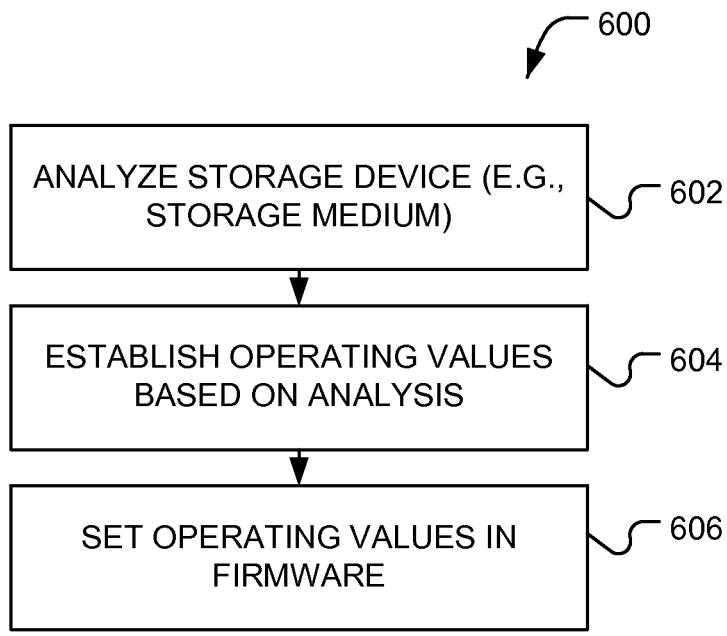

In another example, the technical specifications or warranty conditions can be set by the manufacturer prior to shipping the storage device. In particular, the manufacturer can determine that a particular set of storage media may have a shorter operational life than other storage media. For example as illustrated in FIG. 6, a method 600 includes analyzing the storage device, such as the storage medium of the storage device, as illustrated 602. Sample storage devices or sample storage media can be selected from the set of storage devices or storage media and tested. For example, the testing can include accelerated aging, stress testing, or extensive read/write testing.

Based on the testing, the manufacture can establish operating values or parameters, as illustrated at 604. The operating values can, for example, be threshold values for cumulative usage, or technical specifications for environmental history conditions. Such operating values or parameters can be set within the firmware, as illustrated 606, before the storage device is shipped. In particular, the manufacture can determine the reliability of a storage device and provide a warranty consistent with the quality of the storage device, mitigating risk associated with warranty issues.

In a first aspect, a method of controlling a storage device includes detecting a cumulative usage condition associated with the storage device, comparing the cumulative usage condition to a usage value, and adjusting the operation of the storage device based on the comparison.

In an example of the first aspect, the cumulative usage condition includes cumulative power-on hours. In another example of the first aspect, the cumulative usage condition includes cumulative data transfer. In a further example of the first aspect, the cumulative usage condition includes a number of power-on events.

In a further example of the first aspect and the above examples, adjusting the operation of the storage device includes adding a delay to a data transfer operation. For example, the data transfer operation includes a read operation. In another example, the data transfer operation includes a write operation. In a further example, adjusting the operation of the storage device includes limiting the operation of the storage device to read-only operation.

In an additional example of the first aspect and the above examples, the storage device includes a disk magnetic storage device. In another example of the first aspect and the above examples, the storage device includes a solid-state storage device.

In a further example of the first aspect and the above examples, the method further includes updating a firmware of the storage device and readjusting the operation following updating the firmware.

In a second aspect, a method of controlling a storage device includes detecting an operating condition associated with the storage device, comparing the operating condition to a warranty condition, and limiting the operation of the storage device to read-only operation based on the comparison.

In an example of the second aspect, the operating condition includes a cumulative usage condition. For example, the cumulative usage condition includes cumulative power-on hours. In another example, the cumulative usage condition includes cumulative data transfer. In a further example, the cumulative usage condition includes a number of power-on events.

In a further example of the second aspect and the above examples the operating condition includes an environmental history condition. For example, the environmental history condition includes a vibration characteristic. In another example, the environmental history condition is indicative of operating temperature history. In a further example, the environmental history condition includes a power quality characteristic.

In an additional example of the second aspect and the above examples, the storage device includes a disk magnetic storage device. In a further example of the second aspect and the above examples, the storage device includes a solid-state storage device.

In another example of the second aspect and the above examples, the method further includes updating a firmware of the storage device and permitting read/write operation following updating the firmware.

In a third aspect, a storage device includes a storage medium, a data interface in communication with the storage medium, a controller in communication with the storage medium and the data interface, and non-volatile storage including instructions operable by the controller to detect a cumulative usage condition associated with the storage device, compare the cumulative usage condition to a usage value, and adjust the operation of the storage device based on the comparison.

In an example of the third aspect, the storage medium includes a disk magnetic storage device. In another example of the third aspect, the storage medium includes a solid-state storage device.

In a fourth aspect, a storage device includes a storage medium, a data interface in communication with the storage medium, a controller in communication with the storage medium and the data interface, and non-volatile storage including instructions operable by the controller to detect an operating condition associated with the storage device, compare the operating condition to a warranty condition, and limit the operation of the storage device to read-only operation based on the comparison.

In an example of the fourth aspect, the storage medium includes a disk magnetic storage device. In another example of the fourth aspect, the storage medium includes a solid-state storage device.

In a further example of the fourth aspect and the above examples, the storage device further includes a sensor in communication with the controller. The sensor is to measure an environmental condition. The operating condition is associated with an environmental history associated with the environmental condition measured by the sensor.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of controlling a storage device, the method comprises:
    detecting a cumulative usage condition associated with the storage device;
    comparing the cumulative usage condition to a usage value;
    adjusting the operation of the storage device based on the comparison, wherein the operation of the storage device comprises read and write operations, and wherein adjusting the operation of the storage device comprises slowing read or write operations by adding a delay to a data transfer operation; and wherein
    the cumulative usage condition includes cumulative power-on hours.

2. The method of claim 1, wherein the storage device includes a disk magnetic storage device.

3. The method of claim 1, wherein the storage device includes a solid-state storage device.

4. The method of claim 1, further comprising updating a firmware of the storage device and readjusting the operation following updating the firmware.

5. A method of controlling a storage device, the method comprises:
    detecting a cumulative usage condition associated with the storage device;
    comparing the cumulative usage condition to a usage value;
    adjusting the operation of the storage device based on the comparison, wherein the operation of the storage device comprises read and write operations, and wherein adjusting the operation of the storage device comprises slowing read or write operations by adding a delay to a data transfer operation; and wherein
    the cumulative usage condition includes cumulative data transfer.

6. A method of controlling a storage device, the method comprises:
    detecting a cumulative usage condition associated with the storage device;
    comparing the cumulative usage condition to a usage value;
    adjusting the operation of the storage device based on the comparison, wherein the operation of the storage device comprises read and write operations, and wherein adjusting the operation of the storage device comprises slowing read or write operations by adding a delay to a data transfer operation; and wherein
    the cumulative usage condition includes a number of power-on events.

7. A method of controlling a storage device, the method comprising:
    detecting an operating condition associated with the storage device;
    comparing the operating condition to a warranty condition; and
    limiting the operation of the storage device based on the comparison to read-only operation until a manufacturer provides an firmware update to the storage device and resuming write operation following the firmware update, wherein the operating condition does not comprise error conditions.

8. The method of claim 7, wherein the operating condition includes a cumulative usage condition.

9. The method of claim 8, wherein the cumulative usage condition includes cumulative power-on hours.

10. The method of claim 8, wherein the cumulative usage condition includes cumulative data transfer.

11. The method of claim 8, wherein the cumulative usage condition includes a number of power-on events.

12. The method of claim 7, wherein the operating condition includes an environmental history condition.

13. The method of claim 12, wherein the environmental history condition includes a vibration characteristic.

14. The method of claim 12, wherein the environmental history condition is indicative of operating temperature history.

15. The method of claim 12, wherein the environmental history condition includes a power quality characteristic.

16. The method of claim 7, wherein the storage device includes a disk magnetic storage device.

17. The method of claim 7, wherein the storage device includes a solid-state storage device.

18. The method of claim 7, further comprising updating a firmware of the storage device and permitting read/write operation following updating the firmware.

19. A storage device comprising:
    a storage medium;
    a data interface in communication with the storage medium;
    a controller in communication with the storage medium and the data interface; and
    non-volatile storage including instructions operable by the controller to:
        detect a cumulative usage condition associated with the storage device;
        compare the cumulative usage condition to a usage value;
        adjust the operation of the storage device based on the comparison, wherein the operation of the storage device comprises read and write operations, and wherein adjusting the operation of the storage device comprises slowing read or write operations by adding a delay to a data transfer operation; and wherein
    the cumulative usage condition includes cumulative power-on hours.

20. A storage device comprising:
    a storage medium;
    a data interface in communication with the storage medium;
    a controller in communication with the storage medium and the data interface; and
    non-volatile storage including instructions operable by the controller to:
        detect a cumulative usage condition associated with the storage device;
        compare the cumulative usage condition to a usage value;
        adjust the operation of the storage device based on the comparison, wherein the operation of the storage device comprises read and write operations, and wherein adjusting the operation of the storage device comprises slowing read or write operations by adding a delay to a data transfer operation; wherein
the cumulative usage condition includes a number of power-on events; and wherein
the storage medium includes a disk magnetic storage device.

21. A storage device comprising:
a storage medium;
a data interface in communication with the storage medium;
a controller in communication with the storage medium and the data interface; and
non-volatile storage including instructions operable by the controller to:
  detect a cumulative usage condition associated with the storage device;
  compare the cumulative usage condition to a usage value;
  adjust the operation of the storage device based on the comparison,
  wherein the operation of the storage device comprises read and write operations, and wherein adjusting the operation of the storage device comprises slowing read or write operations by adding a delay to a data transfer operation; wherein
the cumulative usage condition includes a number of power-on events; and wherein
the storage medium includes a solid-state storage device.

22. A storage device comprising:
a storage medium;
a data interface in communication with the storage medium;
a controller in communication with the storage medium and the data interface; and
non-volatile storage including instructions operable by the controller to:
  detect a operating condition associated with the storage device;
  compare the operating usage condition to a usage threshold value; and
  limit the operation of the storage device based on the comparison to read-only operation, until a manufacturer provides an firmware update to the storage device and resuming write operation following the firmware update, wherein the usage condition does not comprise the error conditions.

23. The method of claim 22, wherein the storage medium includes a disk magnetic storage device.

24. The method of claim 22, wherein the storage medium includes a solid-state storage device.

25. The method of claim 22, wherein the storage device further includes a sensor in communication with the controller, the sensor to measure an environmental condition, the operating condition associated with an environmental history associated with the environmental condition measured by the sensor.

* * * * *